United States Patent [19]
Youn et al.

[11] Patent Number: 6,153,137
[45] Date of Patent: Nov. 28, 2000

[54] METHOD FOR APPLYING GRAPHIC IMAGES TO CANDLES

[76] Inventors: Je Dong Youn; Sang Hoon Youn; Soon Young Youn, all of 16120 Manorwood Cir., Tampa, Fla. 33624

[21] Appl. No.: 09/046,747

[22] Filed: Mar. 24, 1998

[51] Int. Cl.⁷ .................................................. B29C 39/12
[52] U.S. Cl. ........................ 264/136; 264/265; 264/267; 264/275; 425/803
[58] Field of Search .................................. 264/135, 275, 264/279.1, 265, 267, 136; 425/803; 431/289

[56] References Cited

U.S. PATENT DOCUMENTS

| | | | |
|---|---|---|---|
| 1,709,889 | 4/1929 | Tasker | 264/135 |
| 2,143,576 | 1/1939 | Replogle et al. | 18/48 |
| 2,354,343 | 7/1944 | Webber et al. | 67/22.5 |
| 2,584,563 | 2/1952 | Duncan | 40/130 |
| 5,697,694 | 12/1997 | Cutts | 362/161 |

FOREIGN PATENT DOCUMENTS 402033397  2/1990  Japan .

*Primary Examiner*—Jan H. Silbaugh
*Assistant Examiner*—Edmund H. Lee
*Attorney, Agent, or Firm*—Ronald E. Smith; Smith & Hopen, P.A.

[57] ABSTRACT

A graphic image is applied to a candle by depositing paper having a preprinted image atop a pool of molten wax for a few moments so that air is driven from the paper. The air-free paper is then positioned inside a candle mold and molten wax is poured into the mold. When the wax has cooled and the candle is removed from the mold, the paper is air bubble-free and is therefor transparent and not visible. The image is as clear as if it had been printed onto the candle. In a second embodiment, the image-bearing paper, after having been deposited atop a pool of molten wax for a few moments, is rolled into a cylindrical shape and placed concentrically into a candle mold having an interior diameter greater than the external diameter of the cylinder. Molten wax is then poured into the mold and the candle is removed when the wax has cooled. The result is the same as the first embodiment, but the image is covered by a layer of wax having a radial thickness equal to the difference between the external diameter of the cylinder and the internal diameter of the candle mold.

9 Claims, 4 Drawing Sheets

METHOD FOR APPLYING GRAPHIC IMAGES TO CANDLES

BACKGROUND OF THE INVENTION

1. Field of the Invention

This invention relates, generally, to methods for making candles so that a substrate having a graphic image imprinted thereon is adhered to the candle. More particularly, it relates to such a method that results in good visual clarity of the graphic image on the candle.

2. Description of the Prior Art

There are several known methods for applying graphic images to candles. One method, as explained in U.S. Pat. No. 5,597,300 to Wahl, is to apply a graphic image directly to the candle by silk-screening, airbrushing, painting, or printing. Wohl also points out that a decal or applique having an image thereon may be adhered to a candle. Silk screening requires use of a silk-screen machine and for that reason may not be suitable for all candle makers. Printing requires printing equipment and may also be unsuitable for use by some candle makers for the same reason. Painting or airbrushing an image onto a candle is quite time-consuming and therefor is not cost effective. Decals and appliqués are difficult to apply because air bubbles usually get under them and make the image unsightly or unclear.

What is needed, then, is a method for applying a graphic image onto a candle in the absence of expensive equipment such as silk-screening machines, printing machines, and the like. The needed method would not require painting or airbrushing of individual candles, and it would produce an image that would be free of bubbles and therefore possess visual clarity.

However, in view of the art considered as a whole at the time the present invention was made, it was not obvious to those of ordinary skill in this art what the needed method should be.

SUMMARY OF THE INVENTION

The long-standing but heretofore unfulfilled need for an apparatus that overcomes the limitations of the prior art is now met by a new, useful, and nonobvious invention. The present invention is a method of applying a graphic image to a candle that includes the steps of bringing wax in a container to a molten state, positioning a sheet of paper having a graphic image thereon into overlying relation to the molten wax, leaving the sheet of paper in said position for a predetermined amount of time, removing the sheet of paper from said position at the end of the predetermined amount of time, positioning the sheet of paper onto a sidewall of a candle mold, and pouring the molten wax into the mold. The graphic image appears on an exterior surface of the candle when the candle is removed from the mold. The graphic image is clear and substantially bubble-free, and the parts of the sheet of paper having no graphic image thereon are substantially invisible.

In a second embodiment, the graphic image appears below the surface of the candle because the paper is rolled into a cylindrical roll of paper having a predetermined external diameter and positioned concentrically into a candle mold having a predetermined internal diameter that is greater than the diameter of the cylindrical roll of paper. Thus, when molten wax is subsequently introduced into the mold, the image is covered with molten wax but it is still bubble free and clear.

It is a primary object of this invention to provide an economical method for applying graphic images to candles.

Another object is to provide a method that results in bubble-free, clear images.

Another object is to provide a method that ensures that the paper upon which a graphic image is pre-printed is rendered substantially invisible.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
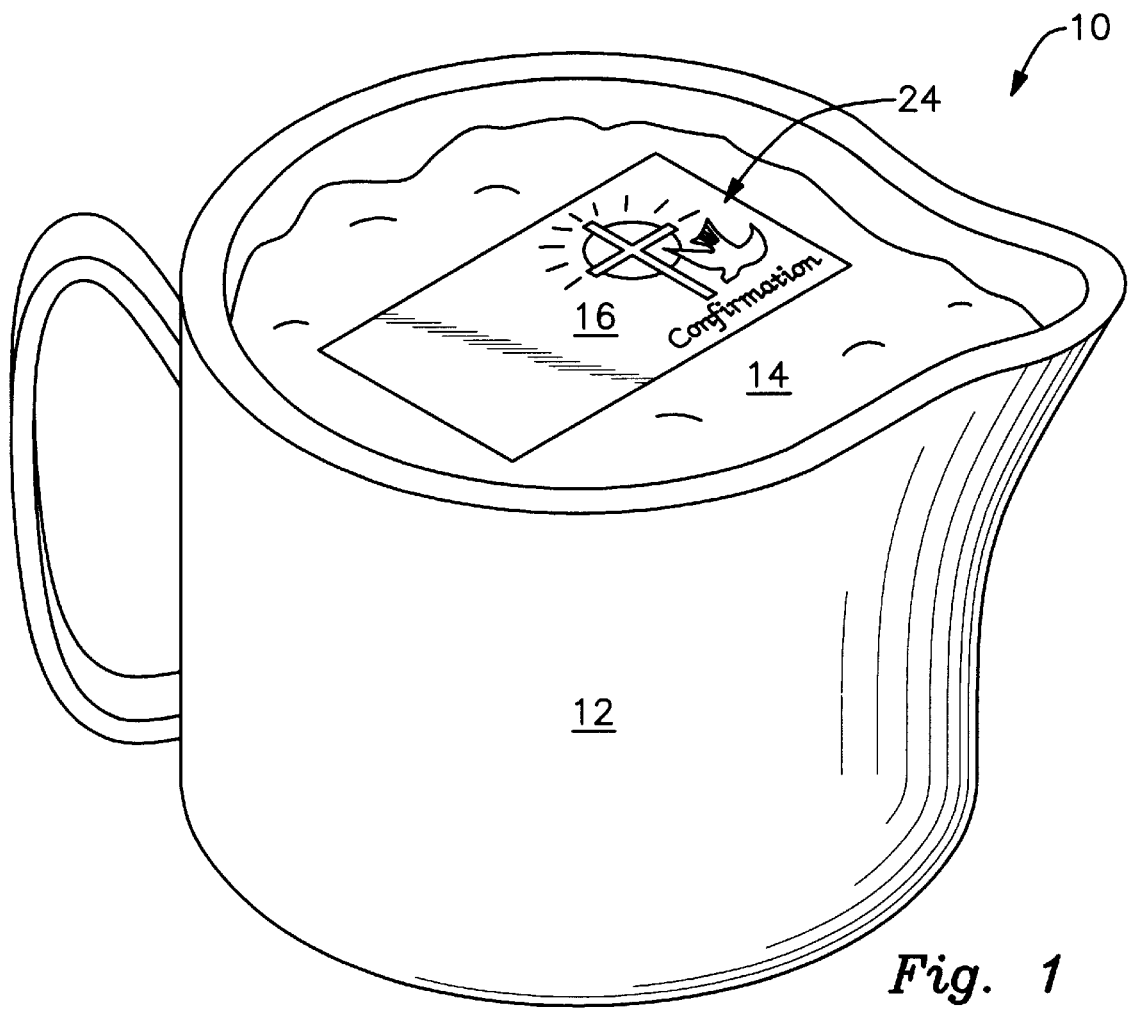
FIG. 1 is the first view of a series of four perspective views depicting the steps of the first embodiment of the novel method.

Referring now to FIG. 1, it will there be seen that the first step of the first embodiment of the novel method is denoted as a whole by the reference numeral 10.

A container, which may take the form of a pitcher 12, holds wax 14 that is brought to a molten state by a flame or other heat source, not shown. The size, shape, and volumetric capacity of container 12 are preselectable by the candle maker and form no part, per se, of the inventive method.

A substrate, which preferably takes the form of a sheet of tissue paper 16, is deposited atop molten wax 14 by suitable means. The paper should be porous and preferably thin but it need not necessarily be tissue paper. However, a waxed substrate such as a decal or appliqué is not acceptable.

Paper 16 must have a graphic image 24 preprinted thereon by any known means. The step of printing or otherwise applying a graphic image to paper 16 is not a part of this invention. Thin, porous paper such as tissue paper having a graphic image preprinted thereon is readily commercially available from multiple sources.

The step depicted in FIG. 1 is a critical step of this invention because the step of positioning a suitable sheet of paper 16 having a graphic image 24 thereon into overlying relation to a body of molten wax 14 has been discovered by the present inventor to drive air bubbles from the interstitial spaces of the paper. When the paper is lifted from the molten wax after about a second, or a few seconds, its interstitial spaces are air-free. Molten wax occupies said interstitial spaces; this prevents the formation of bubbles in the fourth step of the method and thus results in a bubble-free final product.

Figure 2:
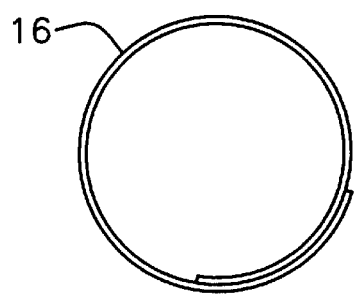
FIG. 2 is the second view of said series.

FIG. 2 depicts the second step of the method. Paper 16, now having wax in its interstitial spaces, is rolled into a cylindrical roll. The opposite ends thereof will cling to one another because wax is inherently adhesive. The amount of overlap of the opposite ends of paper 16 may be nominal.

Figure 3:
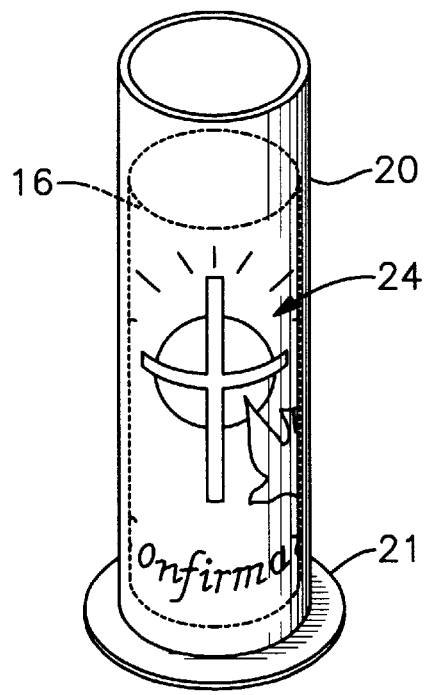
FIG. 3 is the third view of said series.

FIG. 3 depicts the step of positioning cylindrical roll 16 within a candle mold 20 having a base 21. The paper is positioned right side up so that graphic image 24 will be properly oriented when the candle-making process is finished. The diameter of cylindrical roll 16 may be made small relative to the internal diameter of mold 20 prior to insertion of said roll into said mold, and said diameter may then be manually increased so that paper 16 lies wrinkle-free against the internal sidewall of mold 20 in the manner depicted in FIG. 3.

Figure 4:
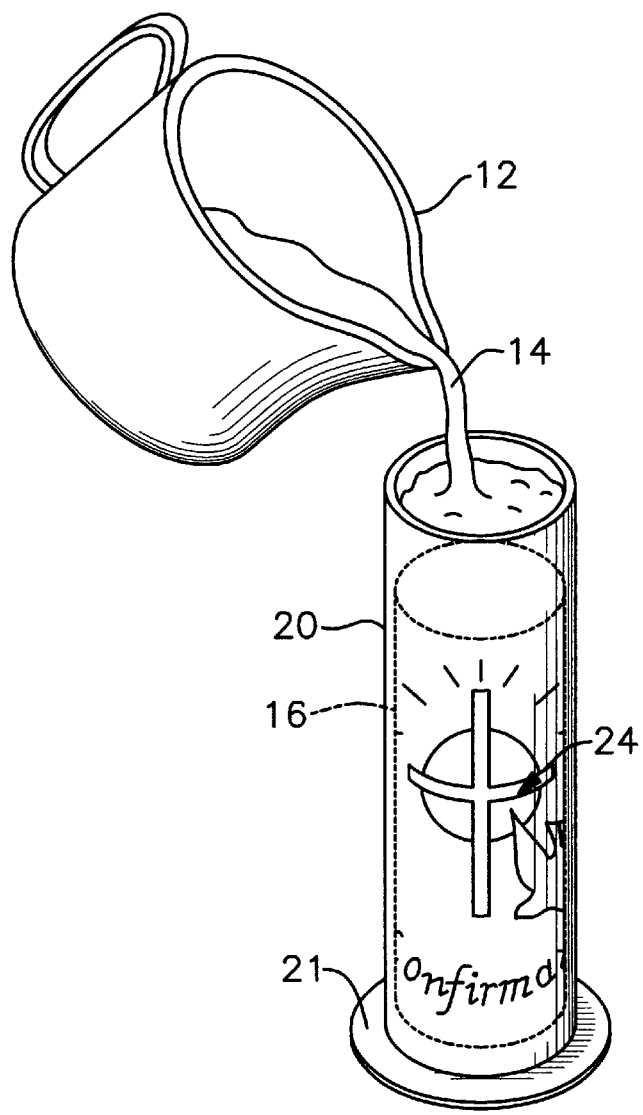
FIG. 4 is the fourth view of said series.

FIG. 4 depicts the fourth step in the novel process. Molten wax 14 is poured into mold 20 and allowed to cool. No bubbles will appear in the final product because no air is in the interstitial spaces of the paper due to the effects of the first step of the novel process. The candle is removed from mold 20 after the wax has cooled and hardened. The removal may be accomplished by removal of base 21 in a well-known way.

Figure 5:
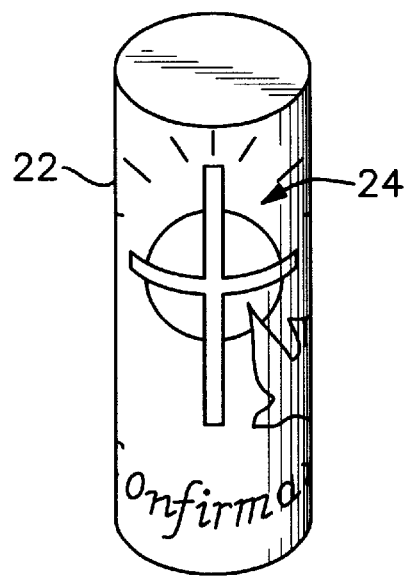
FIG. 5 depicts a candle having a graphic image applied thereto by the steps depicted in the preceding four Figs.

FIG. 5 depicts a candle 22 having graphic image 24 applied thereto by the method just described. Image 24 is clear and bubble-free. Tissue paper 16 or other suitable paper is completely invisible because it is rendered transparent by the novel process, i.e., only the preprinted image 24 can be seen.

Figure 6:
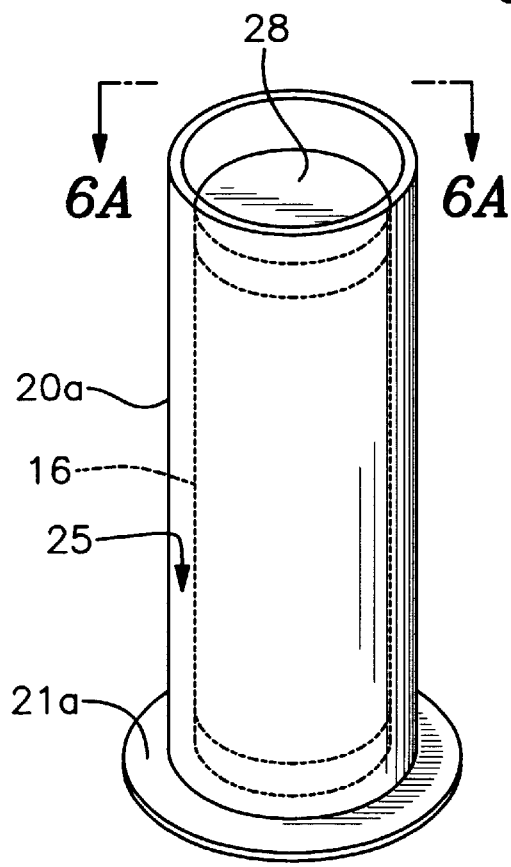
FIG. 6 is the first view of a series of two perspective views depicting the last two steps of the second embodiment of the novel method.
Figure 6A:
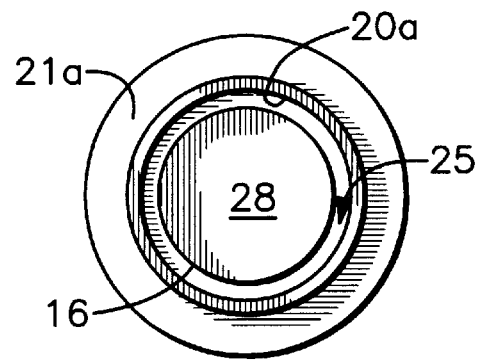
FIG. 6A is a plan view taken along lines 6A—6A in FIG. 6.

The first two steps of the second embodiment are the same as that of the first embodiment and thus need not be re-illustrated; FIGS. 1 and 2 therefore are understood to depict the first two steps of the second embodiment as well. In the third step, depicted in FIG. 6, the paper having the preprinted graphical image is formed into a cylindrical shape as depicted and positioned substantially concentrically within a mold such as mold 20a. The opposite ends of paper 16 overlap slightly and stick to one another due to the molten wax that permeates the interstitial spaces thereof, just as in the first embodiment. The external diameter of paper 16 when rolled into said cylindrical configuration is preselected so that it is less than the internal diameter of mold 20a. Thus, an annular space 25 (FIGS. 6 and 6A) surrounds cylindrical paper 16. The radial extent of the annular space determines the thickness of the wax that will overlie the graphic image when the process has been completed. The paper can be formed into said cylindrical shape without a mold, or it can be formed into said cylindrical shape by wrapping it about a pre-made candle 28 having the desired diameter; when the latter course of action is chosen, pre-made candle 28 having the paper wrapped therearound is positioned concentrically within mold 20a. FIGS. 6 and 6A should be construed as depicting either or both of said two alternative procedures.

Figure 7:
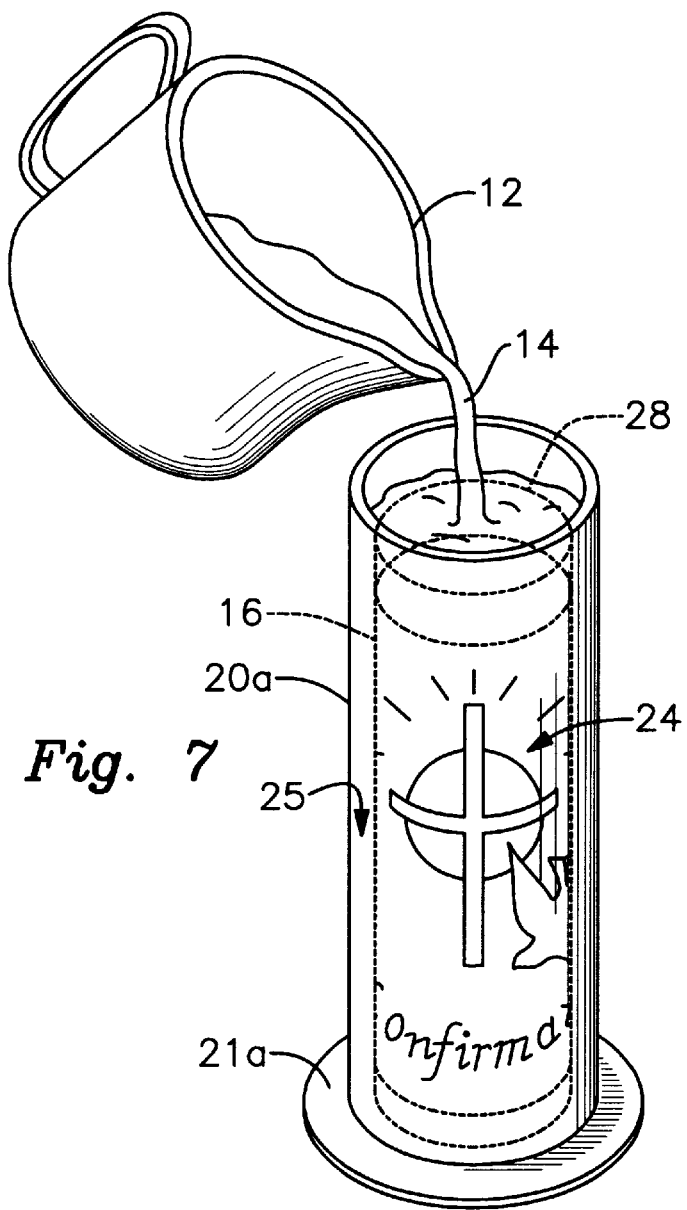
FIG. 7 is the second view of said series.

In the final step of the second embodiment, molten wax is poured into mold 20a as depicted in FIG. 7; if no pre-made candle is used as the base for the cylindrical paper, the molten wax flows into the cylindrical interior of the cylindrical paper 16 and into annular space 25. If a pre-made candle 28 is used as a base, the molten wax flows into annular space 25 only. Either way, the result is the same.

Figure 8:
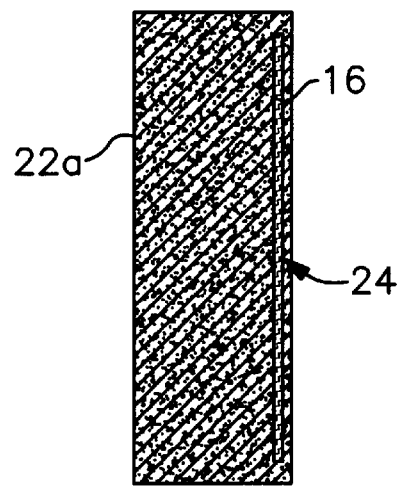
FIG. 8 is a side elevational view of a candle made in accordance with the steps of the second embodiment.

FIG. 8 depicts a candle 22a made by following the steps of the second method; said candle is removed from mold 20a after the wax has cooled and hardened. Image 24 is beneath the exterior surface of the candle but is bubble free. Substrate 16 upon which the image is imprinted is substantially transparent and substantially invisible and the preprinted image is clear and unobstructed by bubbles or other imperfections.

When an opaque mold is used, the candle must of course be removed therefrom so that the image may be seen. When a clear mold is used, the candle can be sold and the image enjoyed while the candle is still in such mold.

In both the first and second embodiments, the step of positioning, for a second or a few seconds, a suitable porous strip of paper having a graphic image thereon into overlying relation to a body of molten candle wax is the critical step that produces a bubble-free final product.

It will thus be seen that the objects set forth above, and those made apparent from the foregoing description, are efficiently attained and since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A method for applying a graphic image to a candle, comprising the steps of:

positioning a sheet of porous paper having a pre-printed graphic image thereon into overlying relation to said molten wax in said container;

leaving said sheet of porous paper in said overlying relation to said molten wax in said container for a predetermined amount of time so that said molten wax enters into interstitial spaces of said porous paper;

removing said sheet of porous paper from said overlying relation to said molten wax in said container at the end of said predetermined amount of time;

positioning said sheet of porous paper onto an internal sidewall of a candle mold; and pouring said molten wax into said mold having said sheet of porous paper positioned against said internal sidewall thereof, said molten wax in the interstitial spaces of said porous paper merging with the molten wax poured into said mold and said porous paper having said pre-printed graphic image thereon becoming an integral part of the candle;

whereby said pre-printed graphic image appears on an exterior surface of said candle when said candle is removed from said mold;

whereby the pre-printed graphic image on said exterior surface of said candle is clear and substantially bubble-free; and whereby parts of said sheet of porous paper having no graphic image thereon are substantially invisible.

2. The method of claim 1, wherein said predetermined amount of time is about a second.

3. The method of claim 1, wherein said sheet of porous paper is a thin sheet of porous paper.

4. The method of claim 3, wherein said sheet of porous paper is tissue paper.

5. A method for applying a graphic image to a candle, comprising the steps of:

bringing wax in a container to a molten state;

positioning a sheet of porous paper having a pre-printed graphic image thereon into overlying relation to said molten wax in said container, leaving said sheet of porous paper in said overlying relation to said molten wax in said container for a predetermined amount of time so that said molten wax enters into interstitial spaces of said porous paper;

removing said sheet of porous paper from said overlying relation to said molten wax in said container at the end of said predetermined amount of time;

forming said sheet of porous paper into a cylindrical roll of porous paper having a predetermined diameter less than an internal diameter of a preselected candle mold;

positioning said cylindrical roll of porous paper into said preselected candle mold in concentric relation therewith; and pouring said molten wax into said mold having said cylindrical roll of porous paper positioned therein, said molten wax in the interstitial spaces of said porous paper merging with the molten wax poured into said mold and said porous paper having said pre-printed graphic image thereon becoming an integral part of the candle;

whereby said pre-printed graphic image appears below an exterior surface of said candle when said candle is removed from said mold;

whereby the pre-printed graphic image below said exterior surface of said candle is clear and substantially bubble-free; and whereby parts of said sheet of porous paper having no graphic image thereon are substantially invisible.

6. The method of claim 5, wherein said predetermined amount of time is about a second.

7. The method of claim 5, wherein said cylindrical roll of porous paper is formed of a thin sheet of porous paper.

8. The method of claim 7, wherein said thin sheet of porous paper is tissue paper.

9. The method of claim 5, wherein a pre-made candle is used as a base around which said sheet of porous paper is rolled to form said cylindrical roll of porous paper.

* * * * *